Feb. 14, 1956
C. E. ANDERSHOCK
2,734,400
CHANGE SPEED MECHANISM FOR A SELF-PROPELLED MINING MACHINE
Filed Nov. 16, 1951
2 Sheets-Sheet 1
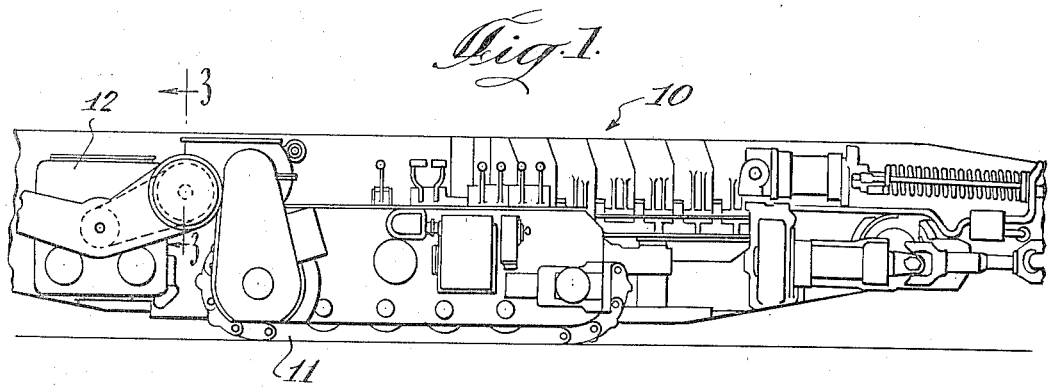
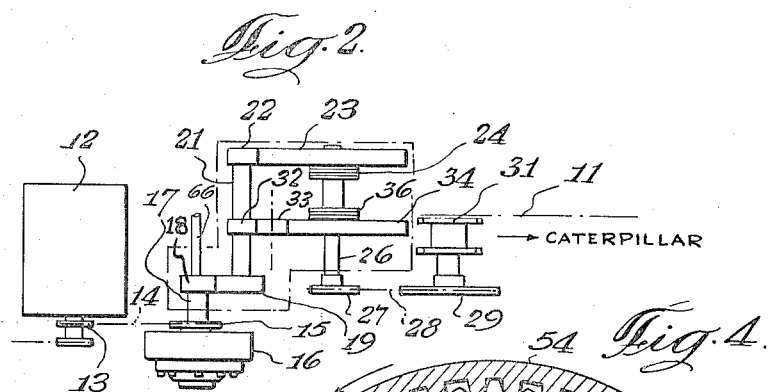
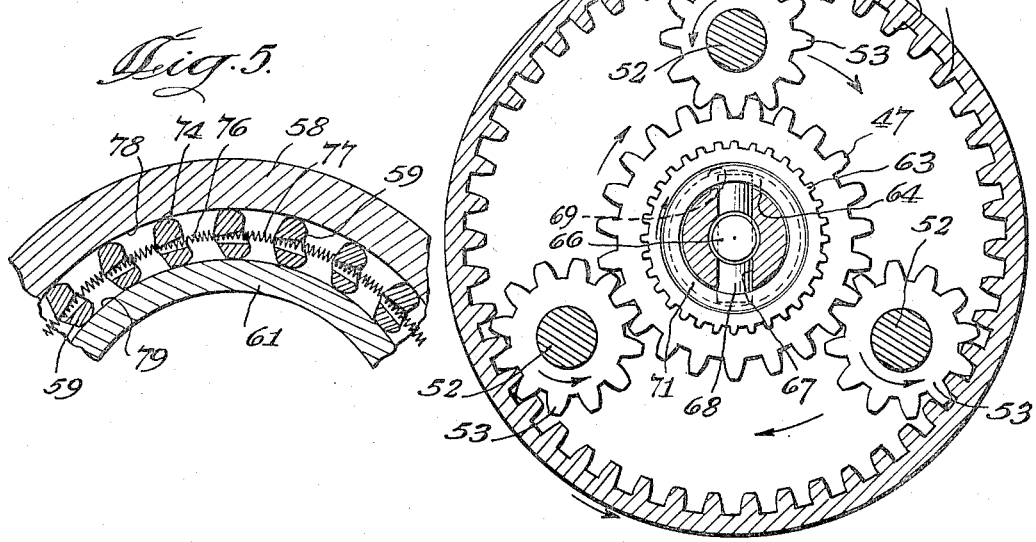
Inventor
Chester E. Andershock
By Murray A. Gleeson
Attorney

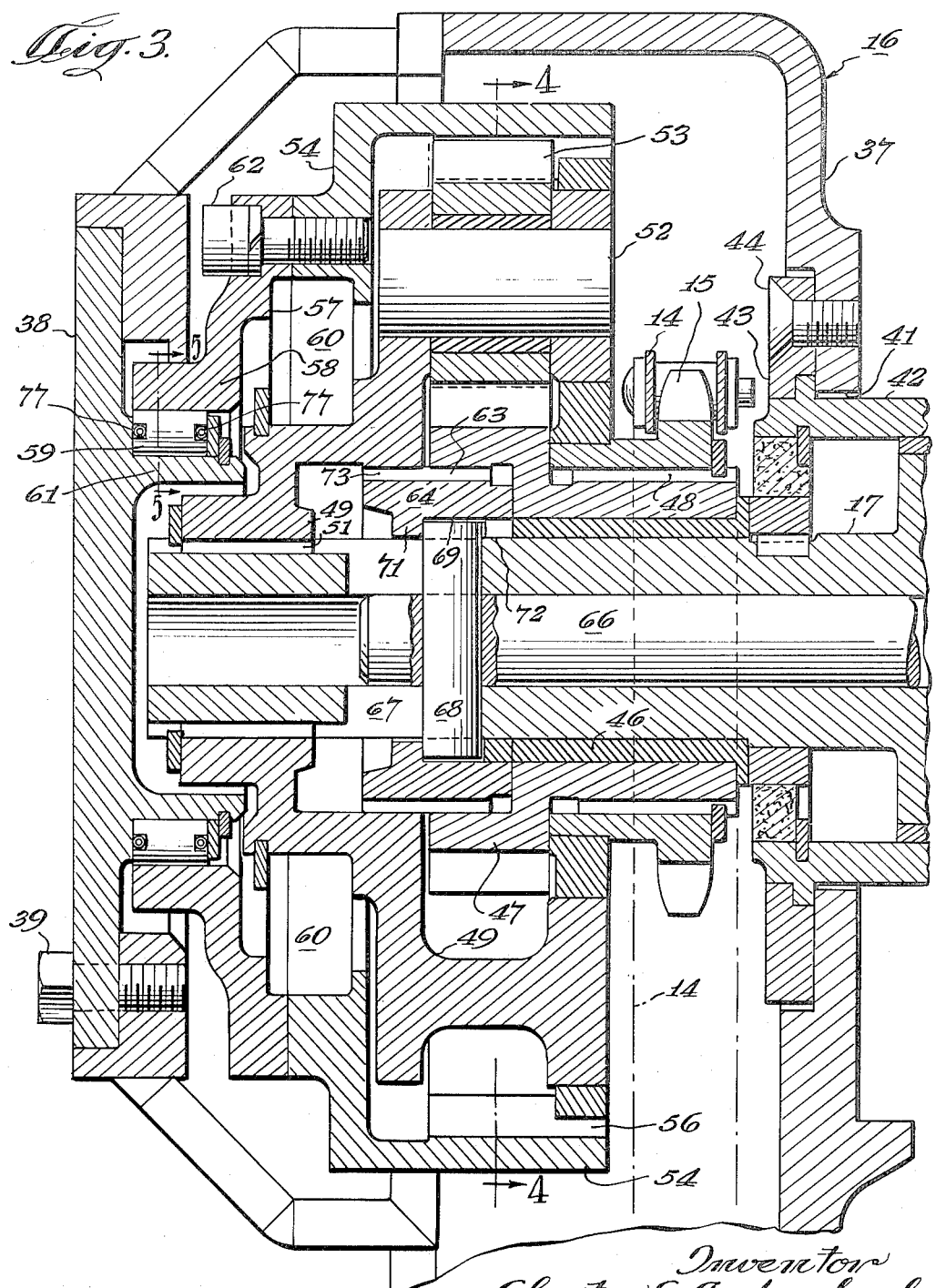

United States Patent Office 2,734,400
Patented Feb. 14, 1956

2,734,400

CHANGE SPEED MECHANISM FOR A SELF-PROPELLED MINING MACHINE

Chester E. Andershock, Chicago, Ill., assignor to Goodman Manufacturing Company, Chicago, Ill., a corporation of Illinois Application November 16, 1951, Serial No. 256,725

3 Claims. (Cl. 74—785)

This invention relates generally to mining machines and particularly to a change speed mechanism for a self propelled mining machine.

In certain types of self propelled mining machinery, of which crawler tread mounted loading machines are an example, operation at both low and high speeds is required, low speed being used for spotting of the machine in a room, and high speed for tramming the machine from one room to another. In carrying out the present invention a constant mesh gear train is employed, and change speed is achieved by an axially movable change speed actuator characterized by complete absence of shifter yokes or shift rails for mounting the shifter yoke.

According to the present invention change speed is achieved by a planetary train having a sun gear driven from a sprocket or the like mounted coaxially therewith, there being a splined connector mounted upon a hollow driven shaft controlled in its movement by a shifter rod movable wtihin and axially of the driven shaft, which driven shaft also affords a support for rotation of the sun gear. The splined connector in one position locks the sun gear with a planetary spider keyed or splined to the driven shaft so that the drive sprocket directly drives the driven shaft, there being a cage for an internal ring gear arranged to lock with the planet gears carried by the planetary spider during such direct connection of the sun gear to the driven shaft, causing the cage to overrun a support therefor. In a second shifted position of the connector the planetary spider is unlocked from the sun gear and the sun gear then drives the planet gears to cause the spider to revolve at reduced speed, the cage then being locked against rotation on its support by its overrunning connection.

It is a principal object of the invention to provide a new and improved change speed mechanism which is characteried by a shifter movable axially of and wtihin the driven shaft of the mechanism.

Other objects and important features of the invention will be apparent from the description following taken with the drawings which together show a preferred embodiment of the invention and what is now considered to be the best mode of practicing the principles thereof. Other embodiments of the invention may be suggested to those having the benefits of the teachings herein, and it is therefore intended that the scope of the invention not be limited by the precise embodiment shown, and only by the spirit and breadth of the appended claims.

In the drawings:

Fig. 1 is a fragmentary side elevation view of a loading machine having embodied therein the change speed mechanism according to the present invention;

Fig. 2 is a schematic view of a forward and reverse train connected to the change speed mechanism according to the present invention, said train being shown as embodied as a part of a loading machine shown in Fig. 1;

Fig. 3 is an enlarged cross-section taken through the change speed mechanism on a line 3—3 of Fig. 1 looking in the direction of the arrows;

Fig. 4 is a reduced in size view of the change speed mechanism taken along the line 4—4 of Fig. 3 looking in the direction of the arrows; and Fig. 5 is a fragmentary detailed view of an overrunning connection of the change speed mechanism, said view being taken along the line 5—5 of Fig. 3 and looking in the direction of the arrows.

Referring particularly to Figs. 1 and 2 of the drawings, there is shown a self propelled mining machine 10 which is used for gathering coal at a working face and loading of the gathered coal onto a transporting vehicle, not shown, such as a shuttle car or the like. The machine 10 is mounted on crawler treads 11, there being a crawler tread 11 on each side of the machine 10. Motive power is supplied to the crawler tread 11 by a drive motor 12, there being a drive motor mounted on each side of the machine for independently supplying power to its assocaited crawler tread 11. The motor 12 is provided with a drive sprocket 13, and a drive chain 14 driven thereby in turn drives a sprocket 15 of a change speed mechanism 16. A driven shaft 17 of the change speed mechanism 16 is provided with a pinion 18 meshing with a pinion 19 mounted on a countershaft 21 of a gear train consisting of a forward pinion 22 meshing wtih a forward driving gear 23, which through a forward clutch 24 turns a drive shaft 26. A driving sprocket 27 is fast to the shaft 26, and a drive chain 28 rides on the sprocket 27 to turn a sprocket 29 to drive a crawler tread sprocket 31 thereby driving the crawler tread 11.

The shaft 21 is also provided with a pinion 32 meshing with an idler reverse gear 33 which in turn meshes with a reverse gear 34. A reverse clutch 36 connects the reverse gear 34 to the shaft 26 when it is desired to reverse the direction of the crawler tread 11. Clutch control means, not shown, are provided for causing clutching engagement of either clutch 24 or clutch 36 according to the direction of movement of the crawler treads 11.

Referring now particularly to Fig. 3, the chain speed mechanism 16 is enclosed within a housing 37 having an end closure 38 held to the housing 37 by means of cap screws 39. The housing 37 has a circular opening 41 therein, and a driven shaft housing 42 extends therethrough, the inner end of the driven shaft housing 42 being supported by an annular ring 43 held to the housing by countersunk screws 44. As seen in Fig. 3, the driven shaft 17 is provided with a bushing 46 upon which is supported a sun gear 47. The sprocket 15 is held for rotation with the sun gear 47 by a key 48.

A planetary spider or planet gear carrier 49 is keyed or splined as at 51 to the end of the driven shaft 17 extending within the housing 37. The spider 49 is provided with stub shafts 52 which support idler planetary pinions 53 meshing with the sun gear 47. A cage or orbit gear 54 is formed integrally with an internal ring gear 56 which meshes with the planetary pinions 53 carried by the spider 49. A support is provided for the cage 54 and comprises an annular shaped member 57 having a hub 58. An overrunning connection 59 is interposed between the hub 58 and an annular flange 61 extending inwardly from the closure 38, the connection 59 and the annular shaped member 57 being thus supported on the flange 61. As seen in Fig. 3, the cage 54 and the annular shaped member 57 are held together by socket head screws 62. A bearing 60 is also interposed between the spider 49 and the cage 54 and annular shaped member 57 to provide for additional support of the cage 54 and member 57.

The sun gear 47 has an internal spline 63 which is engaged by an externally splined shiftable connector 64 which is capable of moving axially with respect to the driven shaft 17. The driven shaft 17 is hollow to receive an axially movable shifter rod 66 nested therein. The shaft 17 is provided with a diametrically extending slot 67, and a pin 68 extends diametrically of the shifter rod 66, the length of the pin 68 being greater than the external diameter of the hollow driven shaft 17, so that the ends of the pin 68 are engaged within an annular recess 69 formed on the interior of the splined connector 64, and between a pair of annular shoulders 71 and 72.

The externally splined connector 64 is adapted to engage an interior splined surface 73 formed on the spider 49, so that the splined connector 64 causes a locking connection between the sun gear 47 and the spider 49. In the position of the splined connector 64 as seen in Fig. 3, the rotation of the sprocket 15 and the sun gear 47 is imparted directly to the spider 49, and since the spider 49 is splined to the hollow driven shaft 17, said shaft will be driven at the same rate as the sprocket 15. During such operative condition of the splined connector 64 the planet gears 53 will be immobile upon their stub shafts 52, and the cage 54 with the annular shaped member 57 will be locked with the spider 49 to rotate therewith on the overrunning clutch 59.

As seen with respect to Fig. 5, the overrunning connection 59 consists of a plurality of sprags 74, each of the sprags 74 having a pair of slots 76 therein through which extends a pair of garter springs 77. The sprags 74 have one end in contact with the inner periphery 78 of the hub 58 and the other end in contact with the outer periphery 79 of the annular flange 61. The sprags are so designed as to permit free rotation of the cage 54 and the hub 58 in a clockwise direction as seen in Fig. 4. As seen in Fig. 5, the hub 58 is adapted to rotate in a clockwise direction with respect to the stationary annular flange 61, the individual sprags 64 canting to the right about the keeper ring 77. Under conditions when there would be a tendency of the hub 58 to rotate in a counterclockwise direction with respect to the stationary annular hub 61, as will be more fully described immediately following, the sprags 74 will tend to rock in a counterclockwise direction about the keeper ring 77, thereby exerting a wedging action for holding the hub 58 and the stationary annular flange 61 in fixed position relative to each other.

When it is desired to operate the gathering and loading machine 10, seen in Fig. 1, at low speed, the shift rod 66 seen in Fig. 3 is moved to the left. This operation of the shift rod 66 moves the splined connector 64 out of engagement with the spline 63 of the sun gear 47. Rotation is continued to be imparted to the sun gear 47 by the sprocket 15 keyed thereto, and the rotation of the sun gear 47 turns the planet gears 53 on their stub shafts 52. This transmission of the torque by the sun gear 47 causes the cage 54 together with its ring gear 56 to tend to be moved in a counter-clockwise direction as seen in Fig. 4, at the same time causing a clutching connection between the annular shaped member 57 and the stationary flange 61 by canting of the sprags 74 to the left as seen in Fig. 4, thereby immobilizing the cage 54 and the internal ring gear 56. Under such condition the spider 49 supporting the pinions 53 will be rotated in the same direction as the sun gear 47 but at a reduced speed, the speed of the spider 59 being in some ratio to the sun gear 47 as determined by the number of teeth on the sun gear, the planet gears and the internal ring gear. Since the spider 49 is keyed to the hollow driven shaft 17, said shaft will be driven at the same lower speed as the spider 49.

As has been described with respect to Fig. 1, each crawler tread 11 is driven by an individual motor 12, and a chain speed mechanism 16 is associated with each crawler tread 11. The shift rod 66 for actuating the splined connector 64 is preferably under the control of a single control rod, not shown, which gives a simultaneous shifting movement to the shift rod 66 for the opposite chain speed mechanism. Such an arrangement for effecting the simultaneous movement of both shift rods 66 forms no part of the invention herein, and it is contemplated that the means for operating the shifter rods 66 simultaneously may take any convenient form.

From the foregoing description it will be apparent that there has been provided a simple and convenient mechanism whereby change speed may be effected in a planetary train. The shift rod 66 and the splined connector 64 for effecting the change speed is wholly enclosed within the housing 37 and within the hollow driven shaft 17, the mechanism according to the present invention being thus characterized by the absence of shifter yokes and shift rails for effecting the change in speed.

While the invention has been described in terms of a preferred embodiment thereof, the scope of the invention is not intended to be limited by the invention shown, nor otherwise by the claims here appended.

I claim:

1. In a change speed mechanism having axially aligned concentrically disposed hollow driving and driven shafts with said hollow driving shaft supported on said hollow driven shaft, a sun gear, means driving said sun gear with said driving shaft, a planet gear carrier having at least one planet gear meshing with said sun gear, means mounting said planet gear carrier fast on said hollow driven shaft, a stationary support, an orbit gear meshing with said planet gear, an overrunning connection between said orbit gear and said stationary support; the improvement comprising a change speed means disposed within the planet gear carrier and sun gear, said change speed means including internal splines formed on said sun gear and said planet gear carrier, an actuator carried by said driven shaft and axially movable in relation thereto, said actuator having external splines mating with the internal splines on said sun gear and said planet gear carrier in one position, said splines on said actuator mating only with the splines on said planet gear carrier in a second position, said orbit gear overrunning said support and being locked with said planet gear carrier for rotation therewith in said first position, said orbit gear being held in fixed position by said overrunning connection in said second position.

2. In a change speed mechanism having axially aligned concentrically disposed hollow driving and driven shafts with said hollow driving shaft supported on said hollow driven shaft, a sun gear, means driving said sun gear with said driving shaft, a planet gear carrier having at least one planet gear meshing with said sun gear, means mounting said planet gear carrier fast on said hollow driven shaft, a stationary support, an orbit gear meshing with said planet gear, an overrunning connection between said orbit gear and said stationary support; the improvement comprising a change speed means disposed within the planet gear carrier and sun gear, said change speed means including internal splines formed on said sun gear and said planet gear carrier, an actuator carried by said driven shaft, said actuator including an externally splined shiftable connector axially moveable in relation to said driven shaft, a diametrically extending slot in said driven shaft, a pin extending transversely of the actuator through said slot with the ends of said pin engaging said externally splined connector, the external splines on said shiftable connector mating with the internal splines on said sun gear and said planet gear carrier in one position, said splines on said shiftable connector mating only with the splines on said planet gear carrier in a second position, said orbit gear overrunning said support and being locked with said planet gear carrier for rotation therewith in said position, said orbit gear being held in fixed position by said overrunning connection in said second position.

3. In a change speed mechanism having axially aligned concentrically disposed hollow driving and driven shafts with said hollow driving shaft supported on said hollow driven shaft, a sun gear, means driving said sun gear with said driving shaft, a planet gear carrier having a planet gear meshing with said sun gear, means mounting said planet gear carrier fast on said hollow driven shaft, a stationary support, an orbit gear meshing with said planet gear, an overrunning connection interposed between said orbit gear and said stationary support; the improvement comprising a change speed means disposed within the planet gear carrier and sun gear, said change speed means comprising an actuator carried by said driven shaft and axially movable in relation thereto, said actuator including connector means locking said sun gear and said planet gear carrier together to drive said hollow driven shaft at the same speed as said sun gear in one position and unlocking said sun gear and said planet gear carrier to drive said driven shaft at a reduced speed in a second position, said orbit gear overrunning said support and being locked with said planet gear carrier for rotation therewith in said first position, said orbit gear being held in fixed position by said overrunning connection in said second position.

References Cited in the file of this patent

UNITED STATES PATENTS

| | | |
|---|---|---|
| 564,488 | Johnson | July 21, 1896 |
| 985,511 | Carter | Feb. 28, 1911 |
| 1,223,514 | Page | Apr. 24, 1917 |
| 1,428,221 | De Martino | Sept. 5, 1922 |
| 1,872,541 | White | Aug. 16, 1932 |
| 1,881,931 | Powell | Oct. 11, 1932 |
| 2,248,240 | King | July 8, 1941 |
| 2,350,810 | Pentz | June 6, 1944 |
| 2,398,716 | Ojutkanges | Apr. 16, 1946 |
| 2,544,061 | Barnett | Mar. 6, 1951 |
| 2,561,936 | McFerren | July 24, 1951 |

FOREIGN PATENTS

| | | |
|---|---|---|
| 319,521 | Italy | July 12, 1934 |
| 887,930 | France | Nov. 26, 1943 |